United States Patent [19]

Ogata et al.

[11] Patent Number: 4,812,638

[45] Date of Patent: Mar. 14, 1989

[54] FOCUSING ERROR DETECTOR AND OPTICAL DATA DETECTING DEVICE INCORPORATING THE FOCUSING ERROR DETECTOR

[75] Inventors: Nobuo Ogata; Yasuo Nakata; Hideaki Satou, all of Nara; Toshiyuki Tanaka, Osaka; Etsuji Minami; Yoshio Yoshida, both of Nara; Yukio Kurata, Tenri, all of Japan; Teruaki Inoue, deceased, late of Nara, Japan, by Takayuki Inoue, Kazuko Inoue, heirs

[73] Assignee: Sharp Kabushiki Kaisha, Osaka, Japan

[21] Appl. No.: 78,773

[22] Filed: Jul. 28, 1987

[30] Foreign Application Priority Data

Jul. 28, 1986 [JP] Japan .............................. 61-178513
Jan. 23, 1987 [JP] Japan .............................. 62-13611
Mar. 31, 1987 [JP] Japan .............................. 62-79241

[51] Int. Cl.$^4$ .............................................. G01J 1/20
[52] U.S. Cl. ...................................... 250/201; 369/44
[58] Field of Search ................ 250/201 DF; 369/44, 369/45, 46

[56] References Cited

U.S. PATENT DOCUMENTS 3,969,573  7/1976  Bouwhuis et al. ................... 350/157
4,326,800  4/1982  Fitts .................................... 250/201
4,574,369  3/1986  Koide et al. .......................... 250/201
4,715,024 12/1987  Musha ................................... 369/44

FOREIGN PATENT DOCUMENTS 0226403  4/1986  European Pat. Off. .
3305675  2/1983  Fed. Rep. of Germany .
2119114  2/1983  United Kingdom .

OTHER PUBLICATIONS

Japanese Abstract #60189723; Scanning Optical Device; 3/9/84; Toshiba.
Japanese Abstract #60241013; Optical Pickup; 5/16/84; Matsushita Denki Sangyo K.K.
Japanese Abstract #59044017; Optical Device; 9/3/82; Canon K.K.

Primary Examiner—David C. Nelms
Assistant Examiner—Jessica Ruoff
Attorney, Agent, or Firm—Birch, Stewart, Kolasch & Birch

[57] ABSTRACT

A focusing error detector comprises a light source, a collimator lens for making parallel the pencil of rays emitted by the light source, an objective lens which focuses the parallel pencil of rays to form a beam spot on a data-recording disc with data tracks and guide tracks formed thereon and which receives the pencil of rays reflected from the data-recording disc, an optical system for forming a beam spot from the reflected pencil of rays incident to the objective lens, and an optical detector having a plurality of divided optical sensor blocks for receiving the formed beam spot so as to detect the focusing error of the beam spot formed on the data-recording disc on the basis of the configuration of the received beam spot.

5 Claims, 9 Drawing Sheets

FIG. I

FIG.3(a)
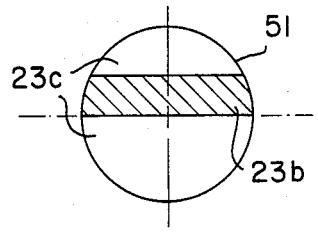
FIG.3(b)
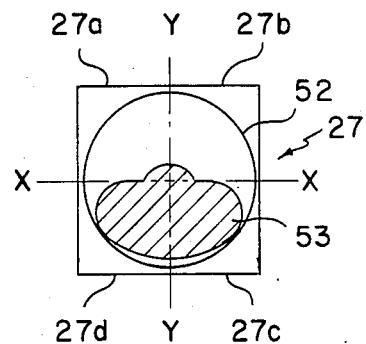
FIG.3(c)
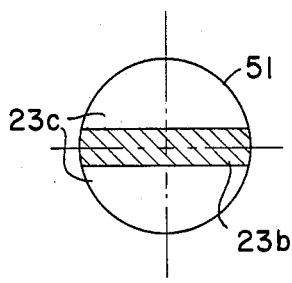
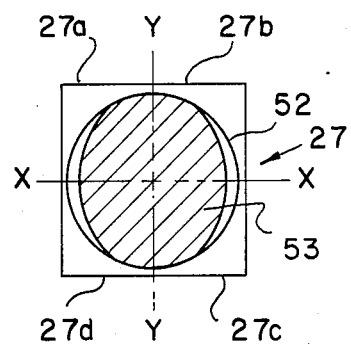
FIG.3(d)
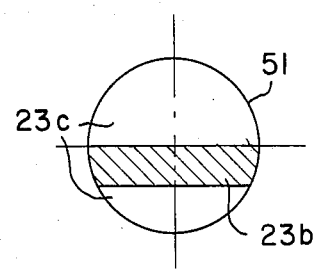
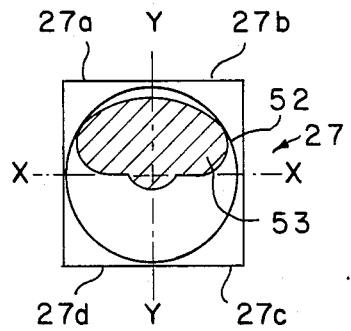
FIG.3(e)
FIG.3(f)

FIG. 6(a)
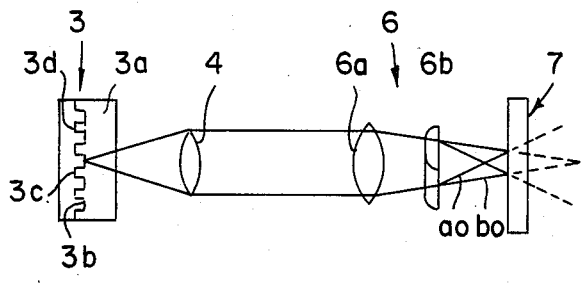
FIG. 6(b)
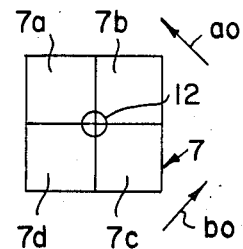
FIG. 6(c)
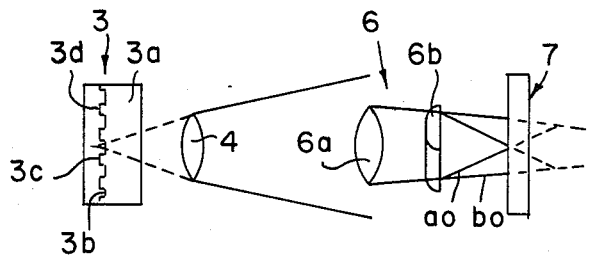
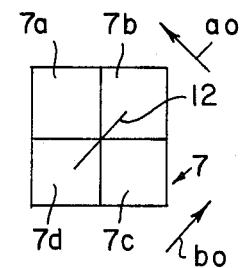
FIG. 6(d)
FIG. 6(e)
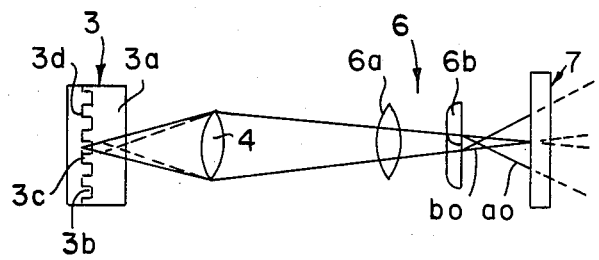
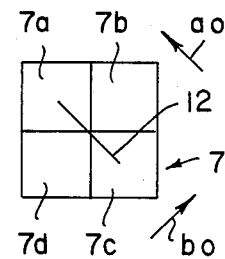
FIG. 6(f)

FIG. 8(a)    FIG. 8(b)
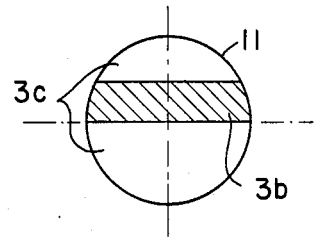
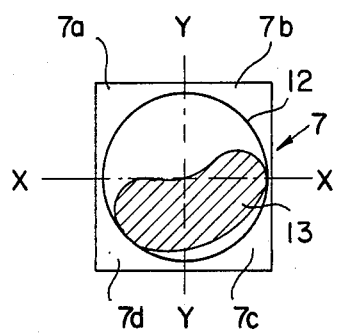
FIG. 8(c)    FIG. 8(d)
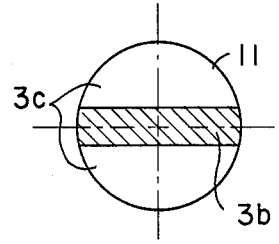
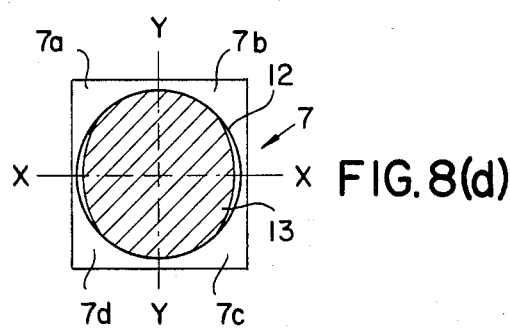
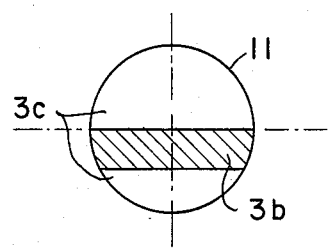
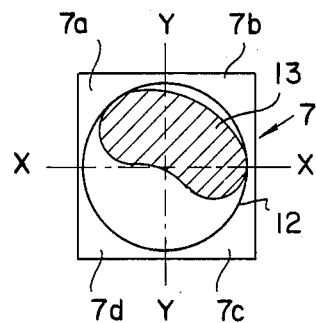
FIG. 8(e)    FIG. 8(f)

FOCUSING ERROR DETECTOR AND OPTICAL DATA DETECTING DEVICE INCORPORATING THE FOCUSING ERROR DETECTOR

BACKGROUND OF THE INVENTION

The present invention relates to a focusing error detector for use in an optical data detecting device which records on or reproduces data from a data-recording disc such as an optical disc or an optical magnetic disc with concentric or spiral data tracks and guide tracks formed on it.

The conventional focusing error detector typically comprises, as shown in FIG. 5, a semiconductor laser 1 as a light source, a collimator lens 2 for making the pencil of rays emitted by the semiconductor laser 1, parallel an objective lens 4 which focuses the parallel pencil of rays to form a beam spot on a data-recording disc 3 and which receives the light beam reflected by the disc 3, a beam splitter 5 for redirecting the reflected light beam incident to the objective lens, an optical system 6 comprising a convergent lens 6a and a cylindrical lens 6b to make the redirected light beam an astigmatic pencil of rays and to form a beam spot, and a quadrant-division optical detector 7 containing four optical sensor blocks 7a, 7b, 7c and 7d divided by two crossing boundaries each at 45 degree to the generating line of the cylindrical lens 6b. The quadrant-division detector 7 senses the beam spot formed on it, thereby detecting the focusing error of the beam spot on the data-recording disc 3 in accordance with the configuration of the beam spot on the quadrant-division optical detector 7.

The data-recording disc 3 comprises a substrate 3a made of a light-transmitting material such as glass, concentric or spiral grooves formed on the substrate 3a to define data tracks 3b and guide tracks 3c, and a data-recording medium 3d comprising a thin film or amorphous rare earth-transition metal amorphous alloy deposited over the substrate 3a by evaporation or sputtering, thereby permitting high density recording and reproduction of data.

Detection of the focusing error of a beam spot formed on the data recording disc 3 is based on the principle as set forth below. Assuming the light quantities received by the four optical sensor blocks 7a through 7d of the quadrant-division optical detector 7 are Sa, Sb, Sc and Sd, respectively, the degree of focalization "f" of a beam spot formed on the data-recording disc 3 is calculated by the expression: $(Sa+Sc)-(Sb+Sd)$.

Since the properly focused beam spot 12 focused properly on the quadrant-division optical detector 7 is round as shown in FIGS. 6(a) and 6(b), the light quantities Sa, Sb, Sc and Sd are equal. Accordingly, the degree of focalization "f" calculated by the expression: $(Sa+Sc)-(Sb+Sd)$ is 0 (zero).

When the objective lens 4 is too close to the disc 3 as shown in FIG. 6(c), the beam spot 12 projected on the quadrant-division optical detector 7 is a ellipse with its major axis oriented in the direction $b_o$ and in parallel to the generating line of the cylindrical lens 6b, as shown in FIG. 6(d). In such a case, the degree of focalization "f" is a negative value.

When the objective lens 4 is too remote from the data-recording disc 3 as illustrated in FIG. 6(e), the beam spot 12 on the quadrant-division optical detector 7 is an ellipse with its major axis oriented in the direction $a_o$ and at right angle with the generating line of the cylindrical lens 9 as shown in FIG. 6(f). In such a case, the degree of focalization "f" is a positive value. If the degree of focalization "f" calculated by the expression $(Sa+Sc)-(Sb+Sd)$ is used as a focusing error signal, it is possible to determine on the basis of the value of the focusing error signal whether the distance between the data-recording disc 3 and the objective lens 4 is proper, too short or too long.

Meanwhile, the beam spot 12 formed on the quadrant-division optical detector 7 contains a shadow 13 attributable to the diffraction by the guide tracks 3c (the shadow will be referred to as a diffraction pattern). Even when the beam spot 12 is properly focused on the quadrant-division optical detector 7 as shown in FIGS. 6(a) and 6(b), the diffraction pattern 13 may vary as illustrated in FIGS. 7(b), 7(d) and 7(f) depending upon the position of the beam spot 11 in relation to the data tracks 3b on the data-recording disc 3 as shown in FIGS. 7(a), 7(c) and 7(e).

When there is no aberration by the optical system between the light source 1 and the data-recording disc 3, the diffraction pattern 13 is symmetrical with respect to the axis corresponding to the direction at a right angle with the guide tracks 3c. Therefor, to the quadrant-division optical detector 7 is positioned in such a manner that the boundary Y—Y dividing the optical sensor blocks 7a and 7b from the optical sensor blocks 7c and 7d coincides with the axis corresponding to the direction at right angles with the guide tracks 3c, the degree of focalization "f" becomes 0, regardless of the diffraction pattern 13 shown in FIGS. 7(b), 7(d) and 7(f), as long as the beam spot 11 is properly focused on the data-recording disc 3.

According to the conventional art, however, when there is an aberration in the optical system between the light source 1 and the data-recording disc 3, displacement of the beam spot 11 in relation to the data tracks 3b of the recording disc 3 as shown in FIGS. 8(a), 8(c) or 8(e) may impair the symmetry of the diffraction pattern 13 with respect to the axis corresponding to the direction vertical to the guide tracks 3c of the recording disc 3 as shown in FIGS. 8(b), 8(d) or 8(f) (this phenomenon is called crosstalk). Consequently, if the beam spot 11 is properly focused, the degree of focalization "f" is positive for the diffraction pattern 13 shown in FIG. 8(b) or negative for the diffraction pattern 13 shown in FIG. 8(f). The degree of focalization "f" is zero only for the diffraction pattern 13 shown in FIG. 8(d).

As a result, even if the objective lens 4 is placed in the range appropriate for focalization, minor variation of the distance between the objective lens 4 and the data-recording disc 3 may cause large fluctuation of the value of the focusing error signal as shown in FIG. 9, which hinders stable focus control.

SUMMARY OF THE INVENTION

Accordingly, it is an objective of the present invention to provide a focusing error detector with stable focus control without deteriorating the quality of a focusing error signal.

Another objective of the present invention is to provide an optical data detecting device incorporating a focusig error detector with stable focus control without deteriorating the quality of a focusing error signal.

Another objective of the present invention is to provide an optical data detecting device provided with means for preventing the quality of a focusing error signal from being deteriorated by projecting a diffraction pattern attributable to guide tracks; projected on an optical detector, against the influence of the aberration in an optical system.

Other objectives and further scope of applicability of the present invention will become apparent from the detailed description given below. It should be understood, however, that the detailed description and specific examples, while indicating preferred embodiments of the invention, are given by way of illustration only, since various changes and modifications within the spirit and scope of the invention will become apparent to those skilled in the art from this detailed description. To overcome the problems of the prior art and to achieve the above objectives, according to an embodiment of the present invention, a focusing error detector comprises a light source; a collimator lens for making the light beams emitted from the light source parallel; an objective lens which focuses the parallel light beams to form a beam spot on a data-recording disc which has data tracks and guide tracks formed on it and which receives light beams reflected from the surface of the data-recording disc; an optical system for forming a beam spot from the reflected light beams incident to the objective lens; and an optical detector having a plurality of divided optical sensor blocks for receiving the beam spot, thereby detecting the focusing error of the beam spot formed on the data-recording disc according to the configuration of the beam spot on the optical detector. The objective lens and/or the collimator lens are placed at such rotating positions as to minimize the influence of an aberration in the optical system between the light source and the data-recording disc on the symmetry of a diffraction pattern in the beam spot formed on the optical detector with respect to the axis corresponding to the direction at a right angles to the guide tracks.

Alternatively, a parallel plate, which is inclined with respect to the optical axis and rotatable about the optical axis, may be placed either in the divergent or in the convergent zone of the optical path between the light source and the data-recording disc. In that case, the parallel plate is controlled to minimize the influence of the aberration in the optical system between the light source and the data-recording disc.

According to the present invention with such construction as mentioned above, if a diffraction pattern is generated in a beam spot on the optical detector due to diffraction by the guide tracks and if the diffraction pattern varies with the displacement of the beam spot on the data-recording disc in relation to the guide tracks, the symmetry of the diffraction pattern with respect to the axis corresponding to the direction vertical to the guide tracks will not be impaired by the influence of the aberration in the optical system between the light source and the data-recording disc. Since the quality of a focusing error signal is not deteriorioated, it is possible to detect a focusing error accurately.

BRIEF DESCRIPTION OF THE DRAWINGS

The present invention will become more fully understood from the detailed description given below and the accompanying drawings which are given by way of illustration only, and thus are not limitative of the present invention and wherein:

FIGS. 3(a), 3(b), 3(c), 3(d), 3(e) and 3(f) show possible positions of a beam spot in relation to the data tracks and the corresponding diffraction patterns;

FIGS. 6(a), 6(b), 6(c), 6(d), 6(e) and 6(f) show the principle on which the conventional focusing error detector detects a focusing error;

FIGS. 8(a), 8(b), 8(c), 8(d), 8(e) and 8(f) show possible positions of a beam spot in relation to the data tracks and the corresponding diffraction pattern in the conventional focusing error detector when the collimator lens and the objective lens generate an aberration;

DETAILED DESCRIPTION OF THE INVENTION

The first embodiment of the present invention is described with reference to FIGS. 1 through 4.

Figure 1:
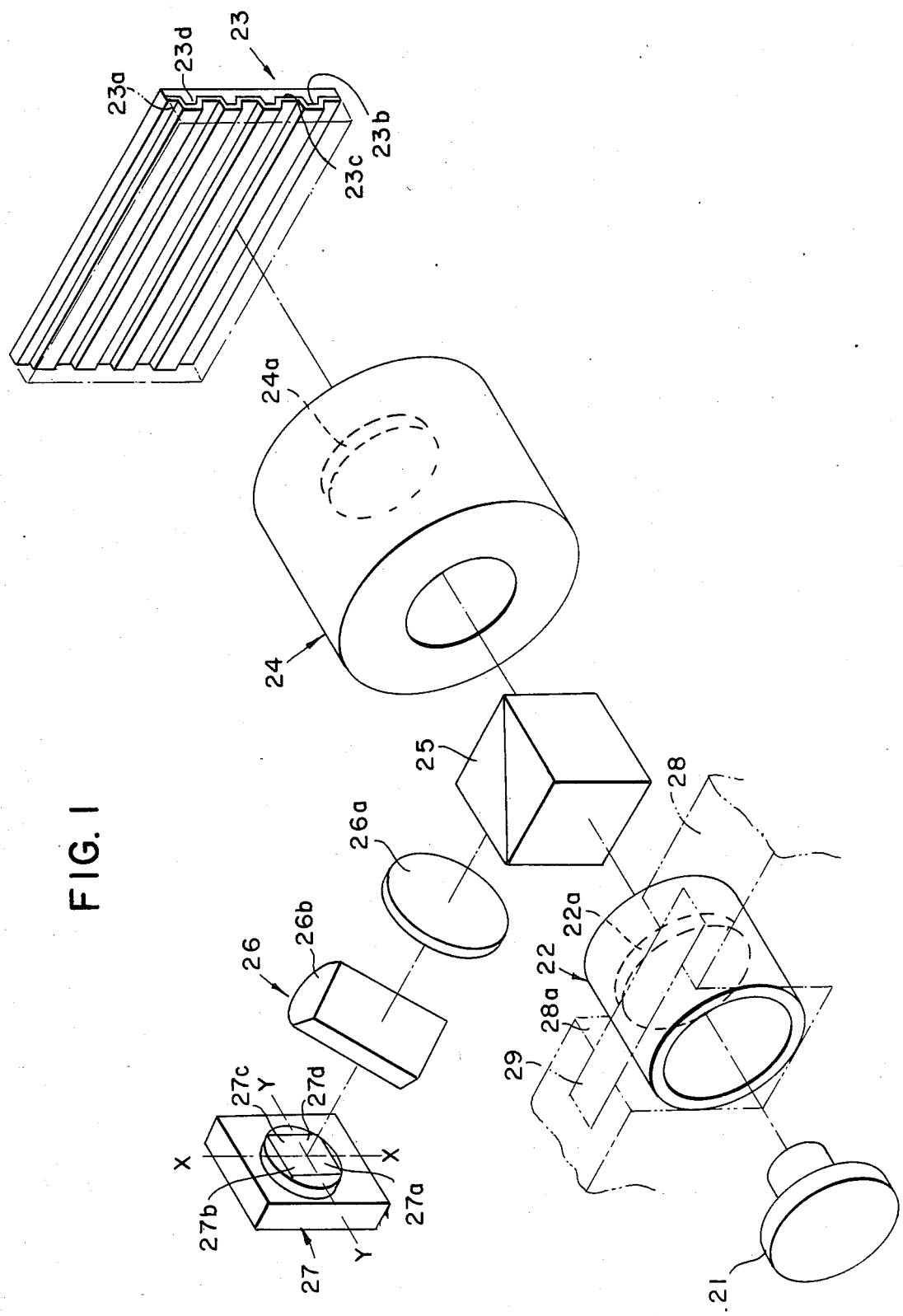
FIG. 1 is an exploded view of a first embodiment of a focusing error detector of the present invention.

As shown in FIG. 1, a focusing error detector comprises a semiconductor laser 21 as a light source; a collimator lens unit 22 including a collimator lens 22a for making the pencil of rays emitted by the semiconductor laser 21 parallel; an objective lens unit 24 including an objective lens 24a for concentrating the parallel pencil of rays to form a beam spot on an optical disc 23 provided as a data-recording disc and for receiving light beams reflected by the optical disc 23; a beam splitter 25 for redirecting the light beams reflected back through the objective lens 24a; an optical system 26 comprising a convergent lens 26a and a cylindrical lens 26b for making the redirected reflected light beam an astigmatic pencil of rays to form a beam spot; and a quadrant-division optical detector 27 for sensing the beam spot formed by the optical system 26 to detect the focusing error of the beam spot on the optical disc 23 according to the configuration of the sensed beam spot.

The collimator lens unit 22 is rotatably mounted in a recess 28a in a housing 28 and retained by a tension plate 29.

Optical disc 23 comprises a substrate 23a made of light-transmitting material such as glass, concentric or spiral grooves formed on the substrate 23a to define data tracks 23b and guide tracks 23c, and having a depth about one-eighth of the wavelength "λ" of the light emitted by the semiconductor laser 21; a data-recording medium 23d composed of a thin layer of an amorphous rare earth-transition metal alloy deposited by evaporation or sputtering over the substrate 23a, thereby permitting high density data recording and reproduction.

The quadrant-division optical detector 27 includes four optical sensor blocks 27a, 27b, 27c and 27d divided by two crossing boundaries X—X and Y—Y which are at 45 degrees to the generating line of the cylindrical lens 26b. The boundary X—X corresponds to the direction parallel to the guide tracks 23c on the optical disc 23, and the boundary Y—Y corresponds to the direction vertical to the guide tracks 23c.

Figure 2:
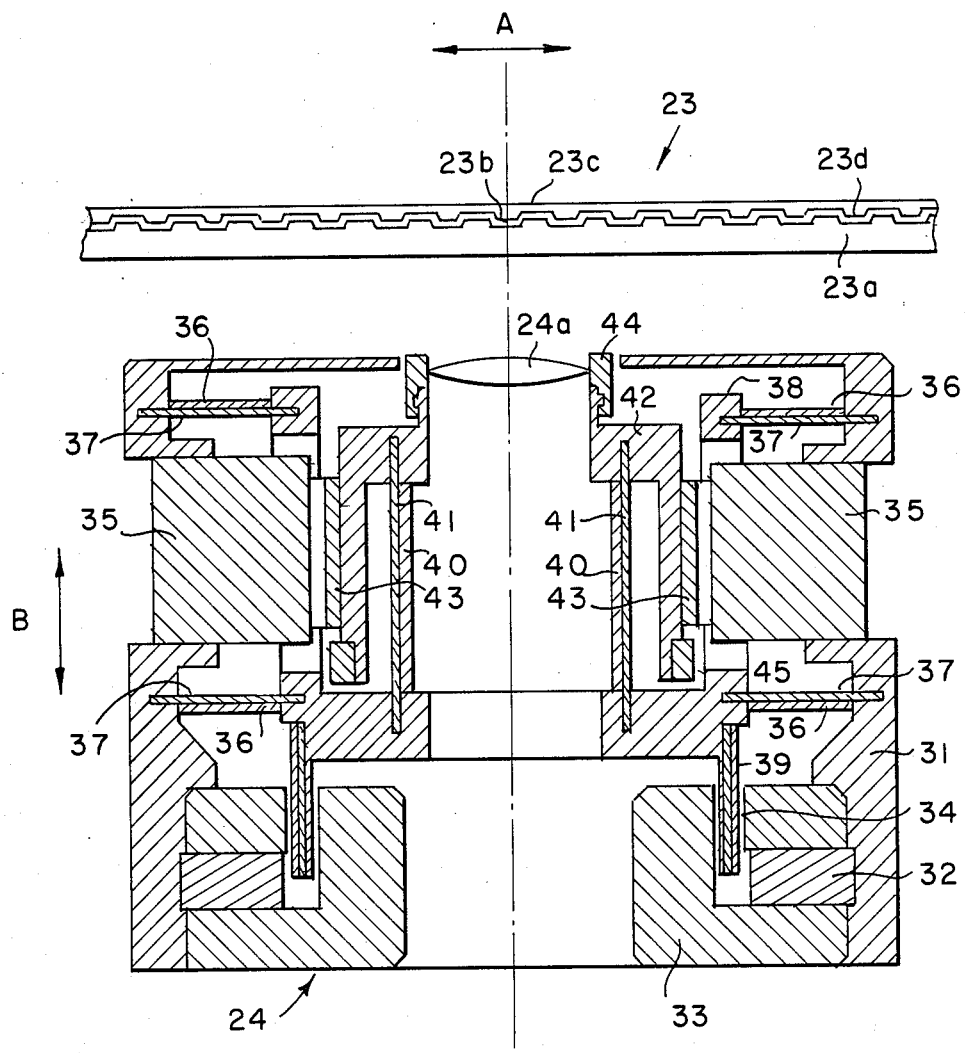
FIG. 2 is a longitudinal sectional view of an objective lens unit.
Figure 4:
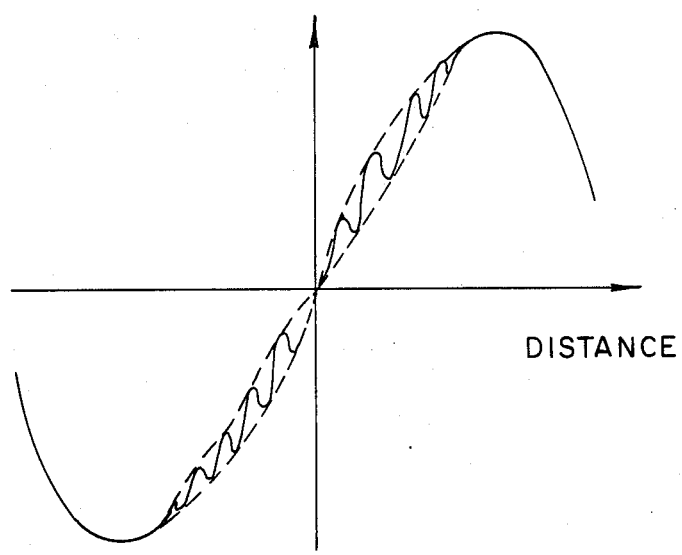
FIG. 4 is a graph showing the relationship between the distance from the optical disc to the objective lens and a focusing error signal.
Figure 5:
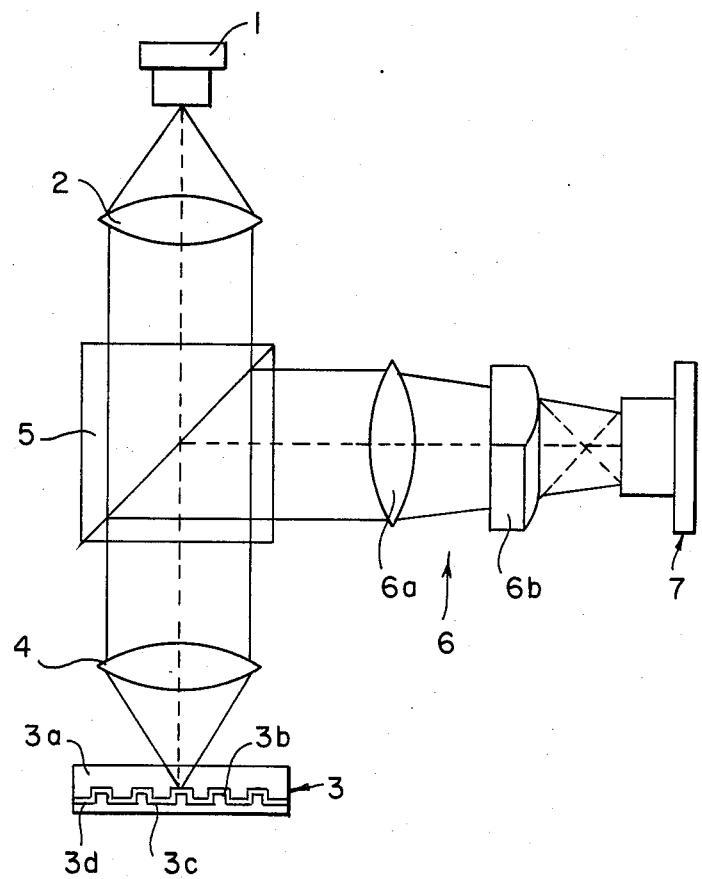
FIG. 5 shows a schematic construction of the conventional focusing error detector.
Figure 7A:
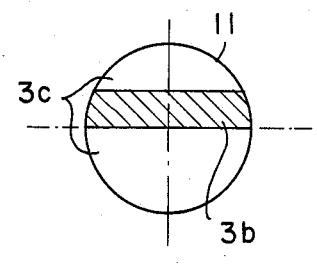
FIGS. 7(a), 7(b), 7(c), 7(d), 7(e) and 7(f) show possible positions of a beam spot in relation to the data tracks and the corresponding diffraction patterns in the conventional focusing error detector.
Figure 7B:
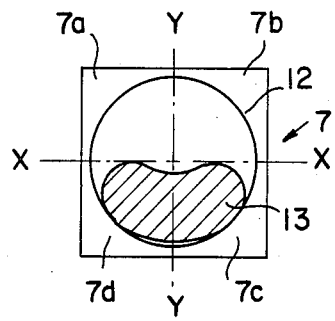
Figure 7C:
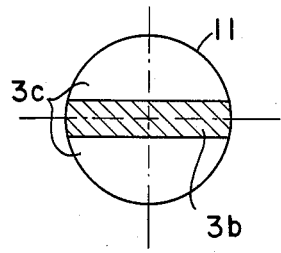
Figure 7D:
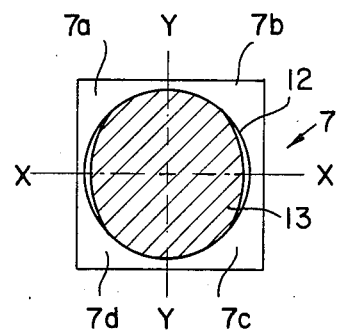
Figure 7E:
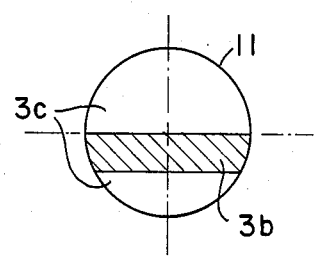
Figure 7F:
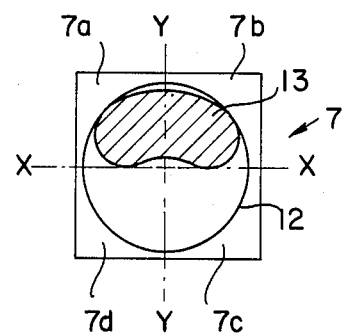
Figure 9:
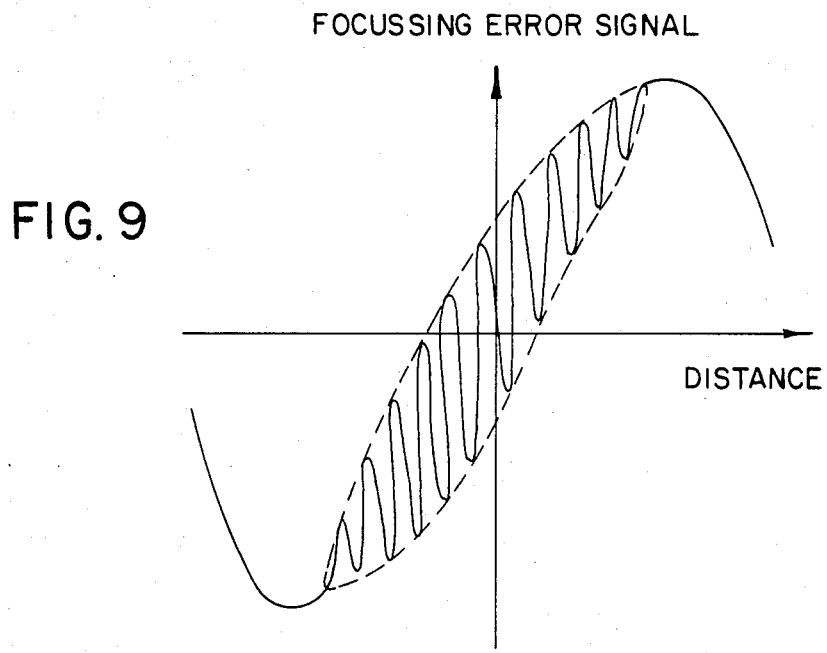
FIG. 9 is a graph showing the relationship between the distance from the optical disc to the objective lens and a focusing error signal in the conventional focusing error detector.

The objective lens 24a is, as understood from FIG. 2, driven both in the radial direction of the optical disc 23 as indicated by an arrow A (referred to as the tracking direction) and in the direction perpendicular to the surface of the optical disc 23 as indicated by an arrow B (referred to as the focusing direction). To move the objective lens 24a in the focusing direction, a focusing magnetic circuit comprising a focusing magnet 32, a focusing yoke 33 and a focusing magnetic gap 34 is provided at an end portion of the inner side of a cylindrical stationary support 31. A tracking magnetic circuit comprising a pair of opposed tracking magnets 35,35 is provided in the vicinity of the other end of the stationary support 31.

An intermediate support 38 movably retained by parallel springs 37, ... is provided within the stationary support 31. The parallel springs 37, ... are lined with elastic rubber materials 36, ... and movable in the focusing direction. At an end of the intermediate support 38, a focusing coil 39 is inserted in the focusing magnetic gap 34 with a specified space around the focusing coil 39.

A movable objective lens barrel 42 which is supported by parallel springs 41,41 is mounted within the intermediate support 38. The parallel springs 41,41 are lined with elastic rubber materials 40,40 and are movable in the tracking direction. On the outside wall of the objective lens barrel 42 are mounted tracking coils 43,43 adjacent to the tracking magnets 35,35. At one end of the objective lens barrel 42, an objective lens holder 44 for retaining the objective lens 24a is mounted rotatably with respect to the objective lens barrel 42. A counter balance weight 45 is provided at the other end of the objective lens barrel 42.

In the focusing error detector of the above construction, a shadow 53 attributable to the diffraction by the guide tracks 23c (referred to as a diffraction pattern) is formed in a beam spot 52 projected on the quadrant-division optical detector 27 as shown in FIGS. 3(b), 3(d) or 3(f). The diffraction pattern 53 changes with displacement of the beam spot 51 in relation to the data tracks 23b on the optical disc 23 as illustrated in FIGS. 3(b), 3(d) and 3(f). In other words, there is no crosstalk in the diffraction pattern 53.

Here, assuming the light quantities received by the four optical sensor blocks 27a, 27b, 27c and 27d of the quadrant-division optical detector 27 are Sa, Sb, Sc and Sd, respectively, the degree of focalization "f" of the beam spot 51 formed on the optical disc 23 is calculated by the expression: $(Sa+Sc)-(Sb+Sd)$. If the beam spot 51 is properly focused, the degree of focalization "f" is always 0 (zero) independent of the position of the beam spot 51 with respect to the data tracks 23b.

Accordingly, if the distance between the objective lens 24a and the optical disc 23 is close to the focal length, it is possible to detect the focusing error accurately on the basis of the degree of focalization "f" which may be positive, zero or negative. This permits stable focusing control.

The positions of the objective lens 24a and collimator lens 22a need not be changed once they have been adjusted. Therefore, after position adjustment, the objective lens 24a may be secured together with the objective lens holder 44 to the objective lens barrel 42, and the collimator lens 22a may be secured together with a colimator lens holder (not shown) to the housing 28 by using adhesives.

In the above first embodiment of the present invention, the rotation position of both objective lens 24a and collimator lens 22a is adjusted, though it is not necessary to adjust both of them. The same advantageous effect as in the above first embodiment is obtained by a modification in which either the objective lens 24a or the collimator lens 22a is adjusted for its rotation position with the other fixed.

Figure 10:
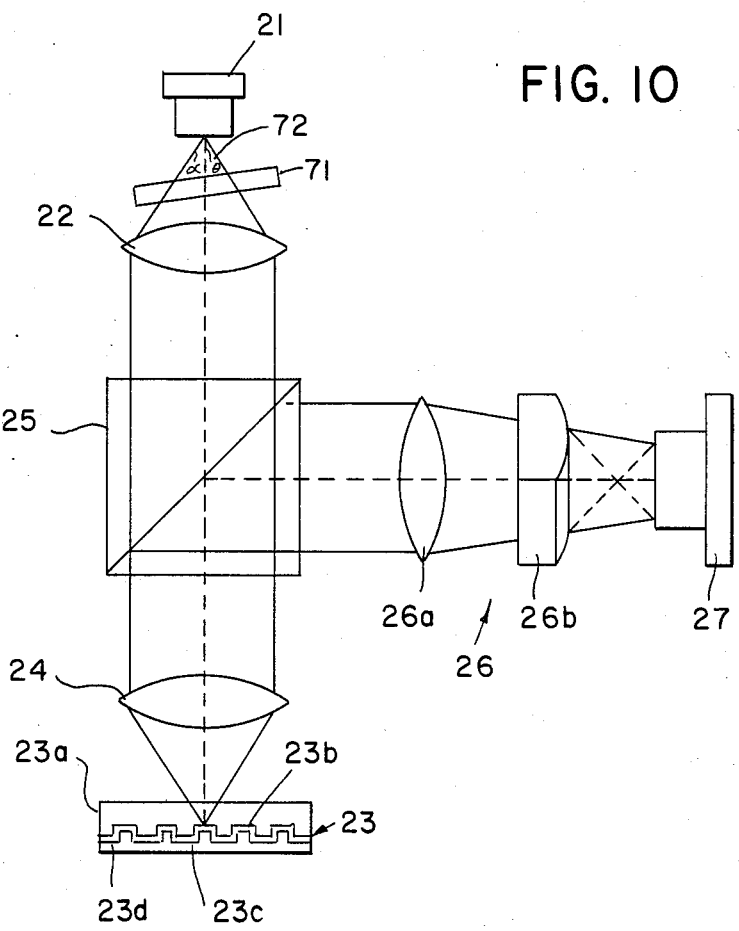
FIG. 10 shows a construction of a second embodiment according to a focusing error detector of the present invention.

The second embodiment of the present invention is described by the following. FIG. 10 shows the construction of the second embodiment according to a focusing error detector of the present invention.

Referring to FIG. 10, a glass parallel plate 71 is disposed between the collimator lens 22 and the semiconductor laser 21. The parallel plate 71 is rotatable about the optical axis 72. Assuming that the parallel plate 71 has a thickness of "t" and a refractive index of "n" and is inclined at the angle $\theta$ with the optical axis in the light beam of the divergent angle $\alpha$, the parallel plate 71 generates an astigmatism expressed by:

$$w = \frac{t}{2} \frac{(n^2-1)\sin^2\theta}{(n^2-\sin^2\theta)^{3/2}} \sin^2\alpha.$$

In the second embodiment, the astigmatism generated by the parallel plate 71 is used to eliminate the astigmatism of the orientation neither parallel nor vertical to the data tracks 23c which astigmatism may remain in the optical system between the light source 21 and the optical disc 23, thereby obtaining a focusing error signal of good quality. Namely, the orientation of astigmatism is controllable by rotating the parallel plate 71 about the optical axis, and the extent of astigmatism is controlled either by changing the inclination angle $\theta$ of the parallel plate 71 or by varying the thickness "t" and refractive index "n" of the parallel plate 71. To obtain a diffraction pattern symmetrical with respect to the axis corresponding to the direction at a right angle to the guide tracks 23c of the optical disc 23 as shown in FIGS. 3(b), 3(d) or 3(f), the parallel plate 71 of the appropriate thickness and of appropriate refractive index is set at an appropriate angle to the optical axis so as to offset the astigmatism originating in the optical system between the light source 21 and the optical disc 23. Thus, according to the present invention, no crosstalk occurs in the diffraction pattern so that stable focus control is attained.

In the above second embodiment of the present invention, the parallel plate 71 is placed in the divergent zone of the laser beam. The same advantageous effect can be obtained by placing the parallel plate 71 in the convergent zone of the laser beam.

According to the present invention, as understood from the above, the aberration in the optical system between the light source and the optical disc is eliminated. Therefore, the symmetry, with respect to the axis corresponding to the direction vertical to the guide tracks, of the diffraction pattern in the beam spot formed on the optical detector can never be impaired by aberration of the optical system. As a result, the focusing error detector of the present invention provides stable focus control without deteriorating the quality of a focusing error signal.

The focusing error detector of the present invention is used in an optical data detecting device which records and reproduces data on a data-recording disc such as an optical disc or an optical magnetic disc with concentric or spiral data tracks and guide tracks formed thereon.

While only certain embodiments of the present invention have been described, it will be apparent to those skilled in the art that various changes and modifications may be made therein without departing from the spirit and scope of the present invention as claimed.

What is claimed is:

1. A focusing error detector, comprising:
 a light source;
 a collimator lens for making pencil of rays emitted by said light source parallel;
 an objective lens which focuses the parallel pencil of rays to form a beam spot on a data-recording disc, said data-recording disc having data tracks and guide tracks formed on it, said objectives lens receiving the pencil of rays reflected from said data-recording disc;
 an optical system for forming a beam spot from the reflected pencil of rays incident from said objective lens; and
 an optical detector for receiving said beam spot from said optical system and having a plurality of divided optical sensor blocks for sensing said beam spot formed on said optical detector, said optical detector detecting a focusing error of said beam spot formed on said data-recording disc according to a configuration of the received beam spot;
 said objective lens or said collimator lens being placed at rotation positions to minimize an influence of an aberration in said optical system between said light source and said data-recording disc on a diffraction pattern's symmetry with respect to an axis corresponding to a direction at a right angle to said guide tracks, said diffraction pattern being formed with said beam spot on said optical detector.

2. A focusing error detector, comprising:
 a parallel plate; inclined with respect to an optical axis corresponding to a light beam and rotatable about an optical axis, being placed in either an optical divergent or a convergent zone of an optical path between a light source and a data-recording disc, said parallel plate being controlled to minimize an influence of an aberration in the the optical system between the light source and the data-recording disc.

3. An optical data detecting device, comprising:
 a light source;
 an objective lens for concentrating pencil of rays emitted from said light source onto a data-recording disc, said data-recording disc having circular or spiral guide tracks formed on it, said objective lens receiving the pencil of rays reflected from said data-recording disc; and
 an optical system for transmitting said reflected pencil of rays into an optical detector having a plurality of divided optical sensor blocks;
 said objective lens being positioned in an orientation to minimize an affect of an aberration caused by said objective lens on a diffractive pattern projected on said optical detector.

4. The focusing error detector as claimed in claim 1, wherein said focusing error detector is mounted in an optical data detecting device.

5. The focusing error detector as claimed in claim 2, wherein said focusing error detector is mounted in an optical data detecting device.

6. The focusing error detector as claimed in claim 1, wherein said objective lens and said collimator lens are both placed at rotation positions to minimize said influence of said aberration in said optical system.

* * * * *